United States Patent [19]

Halasz et al.

[11] Patent Number: 5,890,084
[45] Date of Patent: Mar. 30, 1999

[54] CONTROLLER FOR VEHICULAR SAFETY DEVICE

[75] Inventors: Peter Tancred Halasz, Brownsville, Tex.; Harald Snorre Husby, Lakeland, Fla.

[73] Assignee: Breed Automotive Technology, Inc., Lakeland, Fla.

[21] Appl. No.: 855,329

[22] Filed: May 13, 1997

Related U.S. Application Data

[63] Continuation-in-part of Ser. No. 673,760, Jun. 24, 1996, abandoned.

[51] Int. Cl.⁶ .................................................. B60R 21/32
[52] U.S. Cl. .............................. 701/45; 280/735; 180/282
[58] Field of Search ..................... 364/424.055, 424.056, 364/424.057, 559, 566; 701/45, 46, 47; 280/734, 735, 801.1; 180/268, 271, 281, 282

[56] References Cited

U.S. PATENT DOCUMENTS

| | | | |
|---|---|---|---|
| 3,034,097 | 5/1962 | English et al. ........................... | 180/282 |
| 3,833,084 | 9/1974 | Henderson et al. . | |
| 4,549,277 | 10/1985 | Brunson et al. ......................... | 364/569 |
| 4,679,808 | 7/1987 | Ito et al. ................................. | 180/408 |
| 4,693,493 | 9/1987 | Ikemoto et al. ......................... | 280/707 |
| 4,712,807 | 12/1987 | Kurosawa ................................ | 280/707 |
| 4,749,926 | 6/1988 | Ontolchik ................................ | 318/588 |
| 4,784,237 | 11/1988 | Condine et al. . | |
| 4,803,627 | 2/1989 | Yasuike et al. ..................... | 364/424.05 |
| 4,807,128 | 2/1989 | Ikemoto et al. .................... | 364/424.05 |
| 4,941,683 | 7/1990 | Tabata et al. ............................ | 280/807 |
| 5,029,473 | 7/1991 | Jost et al. ................................ | 280/735 |
| 5,094,478 | 3/1992 | Pfanzeder et al. ...................... | 280/756 |
| 5,102,162 | 4/1992 | Okuda et al. ........................... | 280/707 |
| 5,127,667 | 7/1992 | Okuda et al. ........................... | 280/707 |
| 5,127,671 | 7/1992 | Yano et al. .............................. | 280/806 |
| 5,161,816 | 11/1992 | Okuda et al. ........................... | 280/707 |
| 5,211,423 | 5/1993 | Krambeck ............................... | 280/806 |
| 5,261,506 | 11/1993 | Jost ......................................... | 180/282 |
| 5,288,105 | 2/1994 | Ikegaya et al. ......................... | 280/806 |
| 5,295,714 | 3/1994 | Fühl ........................................ | 280/806 |
| 5,317,542 | 5/1994 | Konopelski ............................. | 367/12 |
| 5,328,256 | 7/1994 | Ohta et al. .............................. | 303/146 |
| 5,364,129 | 11/1994 | Collins et al. .......................... | 280/806 |
| 5,446,658 | 8/1995 | Pastor et al. . | |
| 5,458,396 | 10/1995 | Rost .................................... | 297/216.12 |
| 5,471,388 | 11/1995 | Zomotor et al. .................... | 364/424.05 |
| 5,481,139 | 1/1996 | Lucas ..................................... | 307/9.1 |
| 5,483,449 | 1/1996 | Caruso et al. . | |
| 5,492,368 | 2/1996 | Pywell et al. ........................... | 280/806 |
| 5,510,986 | 4/1996 | Williams ............................ | 364/424.05 |
| 5,510,988 | 4/1996 | Majeed et al. ..................... | 364/424.05 |
| 5,610,575 | 3/1997 | Gioutsos ................................. | 340/429 |

FOREIGN PATENT DOCUMENTS

| | | |
|---|---|---|
| 398307A | 11/1990 | European Pat. Off. . |
| 498312A | 12/1992 | European Pat. Off. . |
| 536996A | 4/1993 | European Pat. Off. . |
| 2571000 | 4/1986 | France . |
| 2292126 | 2/1996 | United Kingdom . |

Primary Examiner—William A. Cuchlinski, Jr.
Assistant Examiner—Edward Pipala
Attorney, Agent, or Firm—L. R. Drayer

[57] ABSTRACT

A control device actuates at least one vehicular safety device such as a seat belt pretensioning mechanism, an airbag, an automatic roll-over bar, a door lock or a cellular phone comprising a sensor stage to sense a plurality of parameters including acceleration, pitch angle and roll angle of a vehicle. A corresponding plurality of digital signals representing each such parameter are generated. A control stage includes circuitry to receive the plurality of digital signals and to generate a control signal corresponding to each such parameter when the corresponding digital signal exceeds a predetermined value. A safety device actuator includes circuitry to receive the control signals and to generate a corresponding actuator signal to actuate the corresponding vehicular safety device.

20 Claims, 8 Drawing Sheets

CONTROLLER FOR VEHICULAR SAFETY DEVICE

This is a Continuation-in-Part of application Ser. No. 08/673,760 filed Jun. 24, 1996, now abandoned.

BACKGROUND OF THE INVENTION

This invention relates to a control device to selectively actuate at least one vehicular safety device when a sudden change in acceleration, pitch angle or roll angle of a vehicle is detected.

Accelerometers that measure pitch and roll angles along a predetermined axis and produce signals representative of such measurements are well known in the art. Likewise, filtering, digitizing, formulating and analyzing the accelerometer signals to assess whether certain action should be taken is also known. These concepts have been disclosed in numerous patents in the fields of motor vehicle suspension control, motor vehicle body roll compensation, roll-over bar activation systems and seat belt pretension systems.

Studies indicate that injuries in motor vehicle accidents, especially at high speeds, can be substantially reduced by the use of occupant restraint systems. These systems commonly include a seat belt pretensioner assembly which is operable to move a seat belt assembly through a pretensioning stroke to remove slack from the seat belt during abrupt changes in an automobile's position. When the motor vehicle is subjected to a sudden change in position relative to the driving surface, caused either by a roll-over or pitch-over, the seat belt pretensioner is actuated to tightly restrain the occupants in a position to minimize movement and prevent contact between the seat occupant and the automobile interior such as the roof, windshield, steering wheel, and side doors. Since an important element of such protective systems is the sensing system which activates the seat belt pretensioner mechanism, the position of the motor vehicle relative to the driving surface must be carefully and precisely monitored so that the seat belt pretensioner is activated rapidly and reliably before the occupants suffer substantial injury.

Other occupant safety devices employed in motor vehicles to be actuated upon the prediction of a roll-over or a pitch-over may include an airbag, an automatic roll-over bar, automatic door locks, and an emergency radio or telephone transmitter.

U.S. Pat. No. 5,102,162 teaches a suspension control apparatus that operates to maintain a level attitude during cornering and turning by computing and map-retrieving from output signals of a vehicle speed sensor and a yaw angular velocity sensor for detecting angular velocity about a yaw axis of the vehicle.

U.S. Pat. No. 5,471,388 discloses a method and apparatus for preventing vehicle handling instabilities, in which a vehicle yaw angular velocity required value is formed from measured quantities (vehicle velocity, steering wheel angle).

U.S. Pat. No. 4,549,277 relates to a multiple sensor inclination measuring system which includes a plurality of single and dual axis inclination sensors and an analog-to-digital convertor to convert a sensor signal to a digital word having a binary value representative of the tilt of the sensor.

U.S. Pat. No. 4,679,808 describes a system for estimating the state of a controlled vehicle's motion which has a steering wheel angle sensor, a vehicle speed sensor, a sensor for sensing a first motion variable such as a yaw rate, a sensor for sensing a second motion variable such as a yaw acceleration, and a processing unit such as a microcomputer.

U.S. Pat. No. 5,161,816 teaches a suspension control apparatus for a vehicle having at least one shock absorber with a controllable damping force. The suspension control apparatus includes a roll angular velocity sensor for detecting angular velocity about a roll axis of the vehicle, and control means for determining a bumpy road driving state of the vehicle when an accumulation time exceeds a predetermined accumulation time. The control means adjusts the damping force of the shock absorber during the bumpy road driving state.

U.S. Pat. No. 4,712,807 discloses a vehicle having a suspension system which includes an actuator for each wheel, each of which is controllable to provide a variable force between the body and the wheel; a sensor for detecting acceleration of the body, and a sensor for each wheel for detecting load acting between the body and the wheel; and a controller for inputting signals representative of the acceleration of the body and the load on each wheel, for calculating based thereupon fluctuations in load acting between the wheels and the body, for controlling the actuators to increase or decrease forces provided thereby between the body and the wheels, and for operating by feedback action by comparing the actual fluctuation in the force between the respective wheel and the body as sensed by the load sensor for the wheel with the calculated value therefor, and for bringing the difference between the two values to be zero.

U.S. Pat. No. 5,510,988 relates to a vehicle that has a real time suspension control which requires, as inputs, a set of absolute body modal velocity signals. Accurate estimates of these signals are derived from relative position sensors at the body suspension points by converting the relative vertical position signals from these sensors to relative body modal (e.g. heave, pitch and roll) velocity signals and passing each of these signals through a second order low pass filter including an additional phase inversion for compensation of the 180 degree filter phase lag. Thus, the necessity of absolute body accelerometers is eliminated, for a significant cost reduction.

U.S. Pat. No. 5,510,986 describes a force actuator that is connected between a vehicle body and each vehicle wheel. A position sensor senses displacement between the vehicle body and each vehicle wheel and provides a position signal indicative thereof. An acceleration sensor senses vertical inertial acceleration of the vehicle body relative to ground at each vehicle wheel and provides an acceleration signal indicative of vertical inertial acceleration of the vehicle body at each vehicle wheel. A controller determines a velocity signal based on each acceleration signal. A force actuator control signal at each vehicle wheel is produced which varies as a function of the plurality of modal forces. A drive circuit processes the force actuator signal at each wheel and applies the processed force actuator control signal at each vehicle wheel to the associated force actuator.

U.S. Pat. No. 5,127,667 teaches a method wherein a pitching motion of bouncing, bottoming, bumpy road driving and braking of a vehicle during driving is correctly grasped by computing and map retrieving from output signals of a vehicle speed sensor, output signals of a brake switch and output signals of a pitch angular velocity sensor for detecting angular velocity about a pitch axis of the vehicle. Pitching motion of the vehicle is restrained by adjusting damping force of shock absorbers of the suspension control apparatus.

U.S. Pat. No. 5,328,256 relates to an anti-skid brake control device that has a control circuit to which signals from a steering angle sensor, a yaw detector, and respective wheel velocity sensors of a motor vehicle are inputted. An oil pressure actuator controls the pressure of the braking fluid for respective wheel cylinders based upon target slip rates and measured slip rates for the respective wheels calculated in the control circuit.

U.S. Pat. No. 4,749,926 describes an automatic trim control system designed to be used on power boats equipped with electric or hydraulic actuated trim tabs. The unit senses out of trim conditions in two planes (pitch and roll) and transmits control signals to the electro-mechanical control lines to reposition the trim tab attitudes, thereby reestablishing preset trim conditions as required.

U.S. Pat. No. 5,317,542 teaches a method wherein a ship's attitude parameters, including pitch, roll and heading, provided in the form of synchro signals by redundant sensors, are distributed to various shipboard systems by a synchro selector binary switching tree under the control of a digital processor. The processor also generates dynamic simulations of pitch, roll and heading, which can be distributed to the shipboard systems by the switching tree.

U.S. Pat. No. 4,803,627 discloses a system for vehicle roll control wherein a plurality of actuator assemblies are provided, one corresponding to each of the vehicle wheels. Each of these actuator assemblies is adapted to increase or decrease the vehicle height at a location corresponding to its corresponding vehicle wheel as results of control signals being applied to it.

U.S. Pat. No. 4,693,493 relates a system for vehicle roll control wherein a plurality of actuator assemblies are provided, one corresponding to each one of the vehicle wheels. These actuator assemblies have pressure chambers, and each is adapted to increase or decrease the vehicle height at a location corresponding to its corresponding vehicle wheel as respective results of supplying or discharging of working fluid to or from its pressure chamber. A vehicle speed detector senses the road speed of the vehicle, and a steering angle detector senses the steering angle of the vehicle. A control computer computes a steady state roll angle of the vehicle body from the vehicle speed sensed by the vehicle speed detector and the steering angle sensed by the steering angle detector, and computes a difference value based thereon, the control computer being adapted to control the working fluid supplying and discharging valves.

U.S. Pat. No. 4,807,128 discloses a system for vehicle roll control wherein one actuator assembly is provided corresponding to each vehicle wheel. Each of these actuator assemblies is adapted to increase or decrease the vehicle height at its vehicle wheel as a result of a control signal being supplied. Control means are provided corresponding to the actuator assemblies and serve to supply control signals to them. A vehicle speed detecting means senses road speed, a steering angle detecting means senses steering angle, a means senses the rate of change of steering angle, and a means detects the actual roll angle of the vehicle body. A computing and control means computes a steady state roll angle of the vehicle body from the vehicle speed and the steering angle, advances the phase of a signal representative of the steady state roll angle to thereby compute a compensating value of roll angle.

U.S. Pat. No. 5,094,478 teaches a convertible motor vehicle with two roll-over bars which can be swivelled into an upwardly directed supporting position. The rollover protection system reduces the risk of injury in the case of a fast, sensor-controlling swinging-up of the rollover bars.

U.S. Pat. No. 5,458,396 discloses a convertible motor vehicle with at least one seat having an extendable roll bar incorporated into an upper portion thereof. Known motion sensors are used to trigger the roll bar and cause a release from its rest position to its operating position.

U.S. Pat. No. 5,492,368 relates to a vehicle seat system for a vehicle seat mounted on the vehicle floor also including a resilient vehicle seat cushion for normally supporting a seated occupant; a lap restraint; a belt pretensioner associated with the lap restraint; and a sensor to activate the belt pretensioner when the vehicle undergoes a displacement condition indicative of a vehicle rollover condition.

U.S. Pat. No. 5,261,506 describes a control device for a passenger safety apparatus wherein the safety apparatus is triggered by a sensor arrangement which responds to a longitudinal and/or transverse acceleration of the motor vehicle. It is also independently triggerable by an additional state-of-motion or moving condition sensor which is configured to recognize a near weightless state of the vehicle.

U.S. Pat. No. 5,364,129 discloses a belt tensioning mechanism that is actuated in response to a vehicle deceleration exceeding a predetermined critical value for retracting the belt buckle. The belt tensioning mechanism includes a sensor for sensing the magnitude of a vehicular deceleration and generating a deceleration signal indicative of a vehicular deceleration exceeded the predetermined critical value.

U.S. Pat. No. 5,295,714 relates a vehicle safety belt system with a gripping means arranged at a webbing section extending between a deflection fitting and a belt retractor.

U.S. Pat. No. 5,288,105 describes a vehicle safety belt pretensioning system which includes a slider to which a cable is attached. A sensor mechanism activates a trigger upon detecting an emergency condition.

U.S. Pat. No. 4,941,683 teaches a vehicle seat belt tightening system for taking up slack in a high acceleration or deceleration condition to positively restrain a vehicle occupant. In particular, the operation reliability may be improved if the reverse rotation of the seat belt tightening unit is prevented by a ratchet mechanism.

U.S. Pat. No. 5,211,423 discloses a vehicle-sensitive belt tensioning mechanism provided for taking up slack in a seat belt in response to a high deceleration condition. The belt tensioning mechanism includes an inertial sensing device for detecting the deceleration forces.

U.S. Pat. No. 5,127,671 describes a pretensioner system for positively eliminating loosening of a seat belt to effectively restrain a vehicle occupant during vehicle collision. The pretensioner system includes a device for sensing acceleration of a vehicle.

Despite these numerous devices, the need for a safety device including a sensing mechanism to activate a seat belt pretensioning mechanism or the like when a roll-over or pitch-over condition exists is not taught in the prior art.

SUMMARY OF THE INVENTION

There is provided in accordance with one aspect of the present invention a control device to activate a seat belt pretensioning mechanism and/or other vehicular safety device in case of a motor vehicle roll-over or pitch-over movement.

There is provided in accordance with another aspect of the present invention logic and a method for predicting roll-overs and pitch-over movements in motor vehicles and for activating vehicular safety devices in response to the predictions.

There is provided in accordance with another aspect of the present invention logic and a method for analyzing signals produced by accelerometers for sensing vehicular attitude to predict roll-overs or pitch-over movements in motor vehicles.

There is provided in accordance with another aspect of the present invention logic and a method for analyzing signals produced by accelerometers for sensing the X-axis (pitch-over) and Y axis(roll-over and for z-axis (pitch and roll) in motor vehicles for activating vehicular safety devices based on those signals.

There is provided in accordance with another aspect of the present invention logic and a method for both sensing and/or predicting roll-over or pitch-over movements in motor vehicles and for activating appropriate vehicular safety devices based on either sensing and/or predicting roll-over, or pitch-over movement.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE INVENTION

Figure 1:
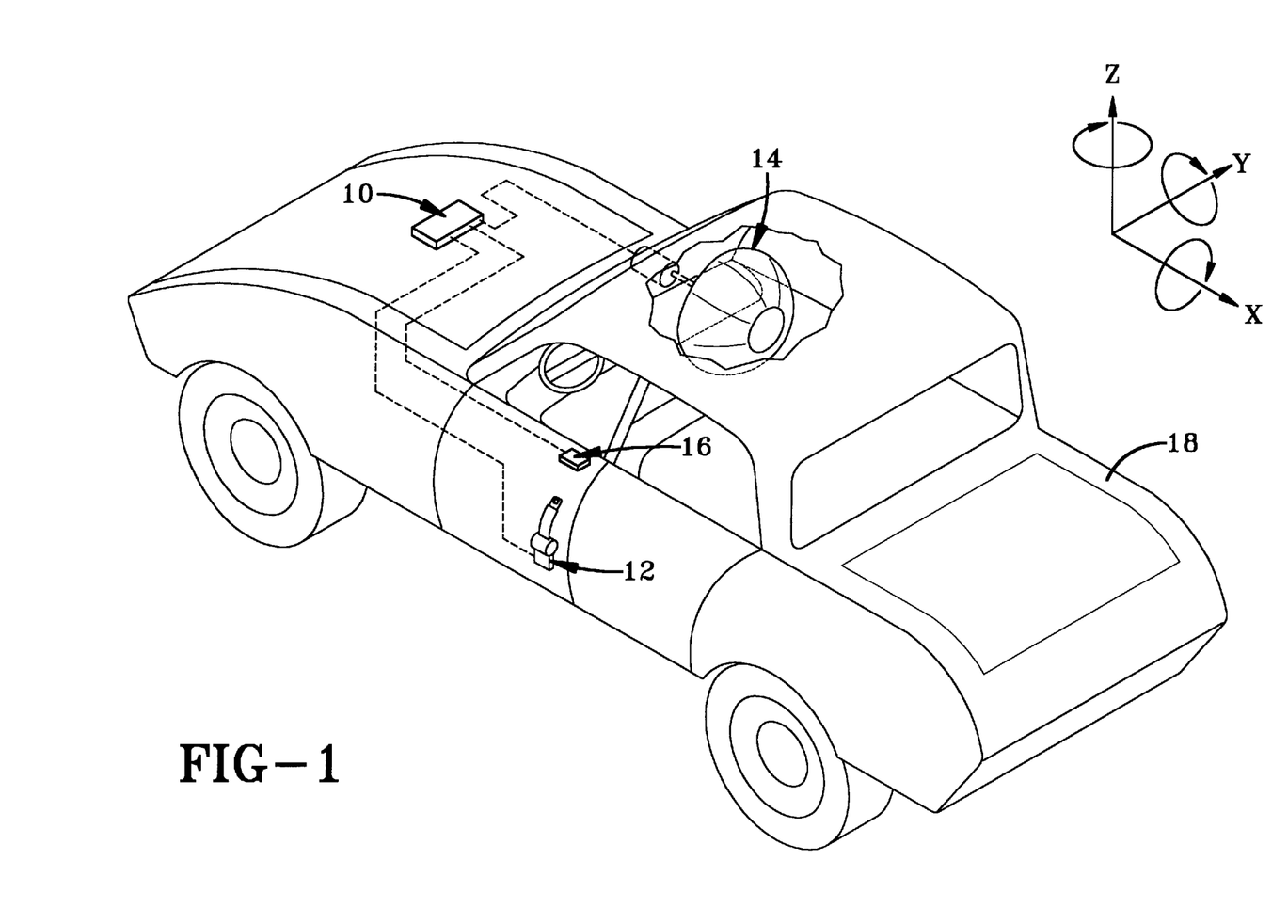
FIG. 1 is a perspective view of a vehicle with the control device of the present invention.

As shown in FIG. 1, the present invention relates to a control device 10 to selectively actuate at least one vehicular safety device such as a seat belt pretensioning mechanism 12, an airbag 14 or an automatic door lock 16 of a vehicle 18.

Figure 2:
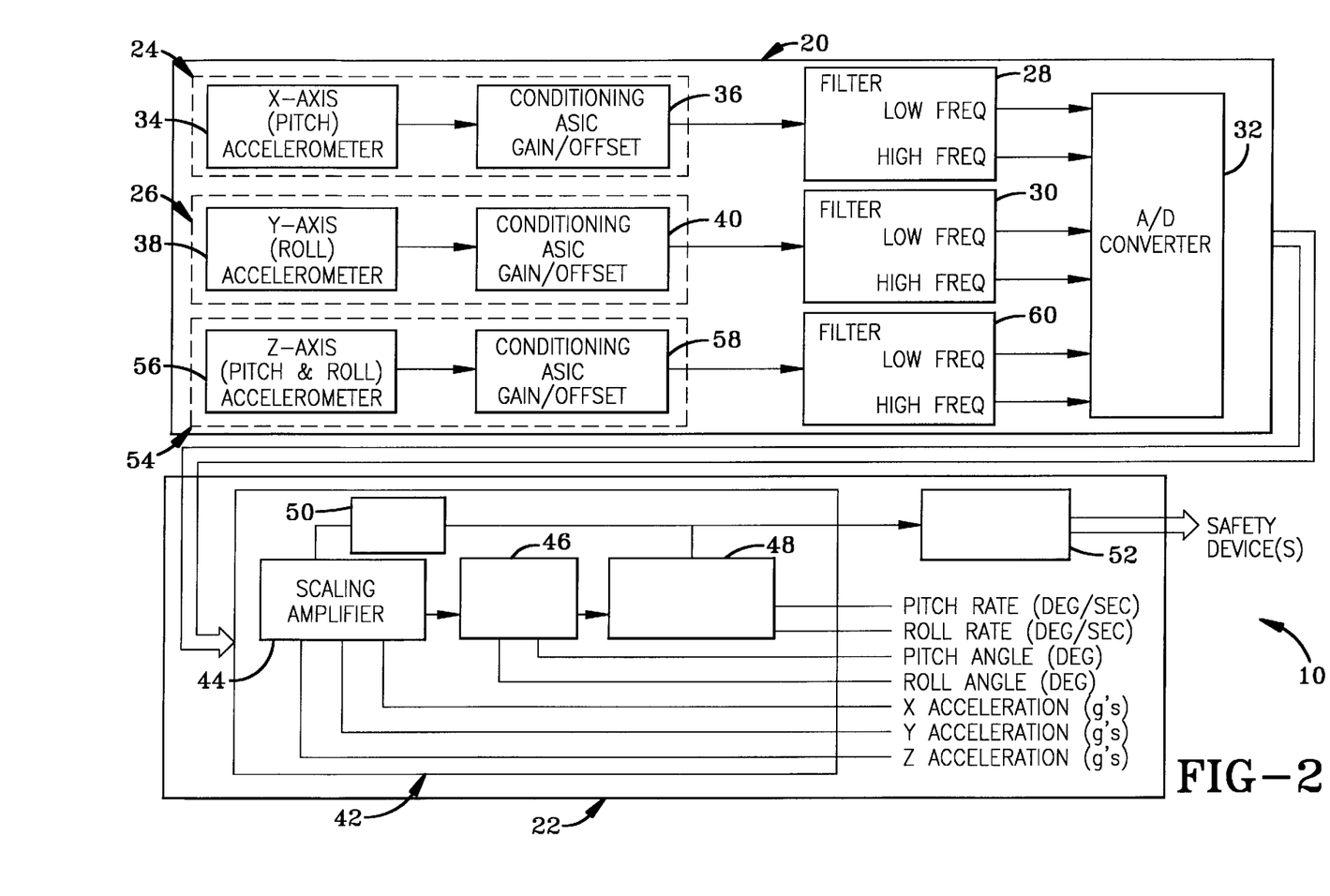
FIG. 2 is a block diagram of the control device of the present invention.

As shown in FIG. 2, the control device 10 comprises a sensor means 20 to sense a plurality of parameters including acceleration, pitch and roll angles of the vehicle as defined hereinafter and to generate a corresponding plurality of digital signals representing each such parameter. A control means 22 comprises a control signal generator means including control logic circuitry to receive the plurality of digital signals and to generate a control signal corresponding to each such parameter when the corresponding digital signal exceeds a predetermined value. A safety device actuator signal generator means includes actuator logic circuitry to receive the control signals and to generate a corresponding actuator signal to actuate the corresponding vehicular safety device 12, 14, or 16 as described more fully hereinafter.

For convention, an angle of inclination is defined as the rotation of an object with respect to the Earth's surface. Two angles, roll and pitch, completely describe the inclination of an object such as a vehicle with respect to the Earth's surface. With reference to the control device 10 of the present invention, three single axis micromachined capacitive type accelerometers may be used for measuring these angles.

As shown in FIG. 1, the pitch angle, or inclination, of the longitudinal center line of the vehicle 18 relative to the roadway is measured about the X-axis and the roll angle or inclination of the transverse center line of the vehicle 18 is measured about the Y-axis. As described more fully hereinafter, the control device 10 measures pitch and roll angles of inclination and calculates the pitch and roll angle rates of change to predict when the vehicle will rotate through a predetermined arc about the X-axis (pitch) or Y-axis (roll) defined as a pitch-over condition and a roll-over condition respectively. These calculations are dependent on several constants which vary with different makes and models of vehicles. These constants include the weight, the center of gravity, the height, width, and length and other characteristics such as acceleration and braking of the vehicle 18. In certain conditions, such as panic braking, vehicle spin (yaw) and sliding, the data from the Z-axis accelerometer will be used to augment the data from the X and Y axis accelerometers to improve the discriminating and predictive ability of the device.

The control device 10 comprises a sensing means 20 and a control means 22. As shown in FIG. 2, the sensing means 20 comprises a first 24, second 26 and third 54 sensing elements, corresponding first 28, second 30 and third 60 high and low frequency filters, and an A/D (analog to digital) converter 32. The first sensing element 24 comprises an X-axis accelerometer 34 and a corresponding conditioning Application Specific Integrated Circuit (ASIC) 36. The second sensing element 26 comprises a Y-axis accelerometer 38 and a corresponding conditioning ASIC 40. The third sensing element 54 comprises a Z-axis accelerometer 56 and a corresponding conditioning ASIC 58. As previously described, the X-axis accelerometer 34, the Y-axis accelerometer 38 and the Z-axis accelerometer 56 generate analog signals corresponding to the angular inclination or disposition of the vehicle 18 relative to the roadway. The conditioning ASICs 36, 40, and 58 calibrate the corresponding analog signals from the X-axis accelerometer 34, the Y-axis accelerometer 38 and the Z-axis accelerometer 56, such as a ratio of 1 G to 1 volt. Of course, as previously mentioned, a three axis accelerometer is equally suitable. The first, second and third filters 28, 30 and 60, respectively filter the corresponding analog signals from the first, second and third sensing elements 24, 26 and 56 respectively into a first, or low frequency, band width such as from about 0 Hz to about 40 Hz corresponding to or representing the angles of inclination to the X-axis and Y-axis relative to the roadway indicative of the pitch and roll condition of the vehicle respectively and a second or high frequency band width such as from about 0 Hz to about 2000 Hz corresponding to or representing acceleration indicative of an impact due to a collision. The low and high frequency analog signals from the first, second and third filters 28, 30 and 60 are digitized by the A/D converter 32.

Figure 3:
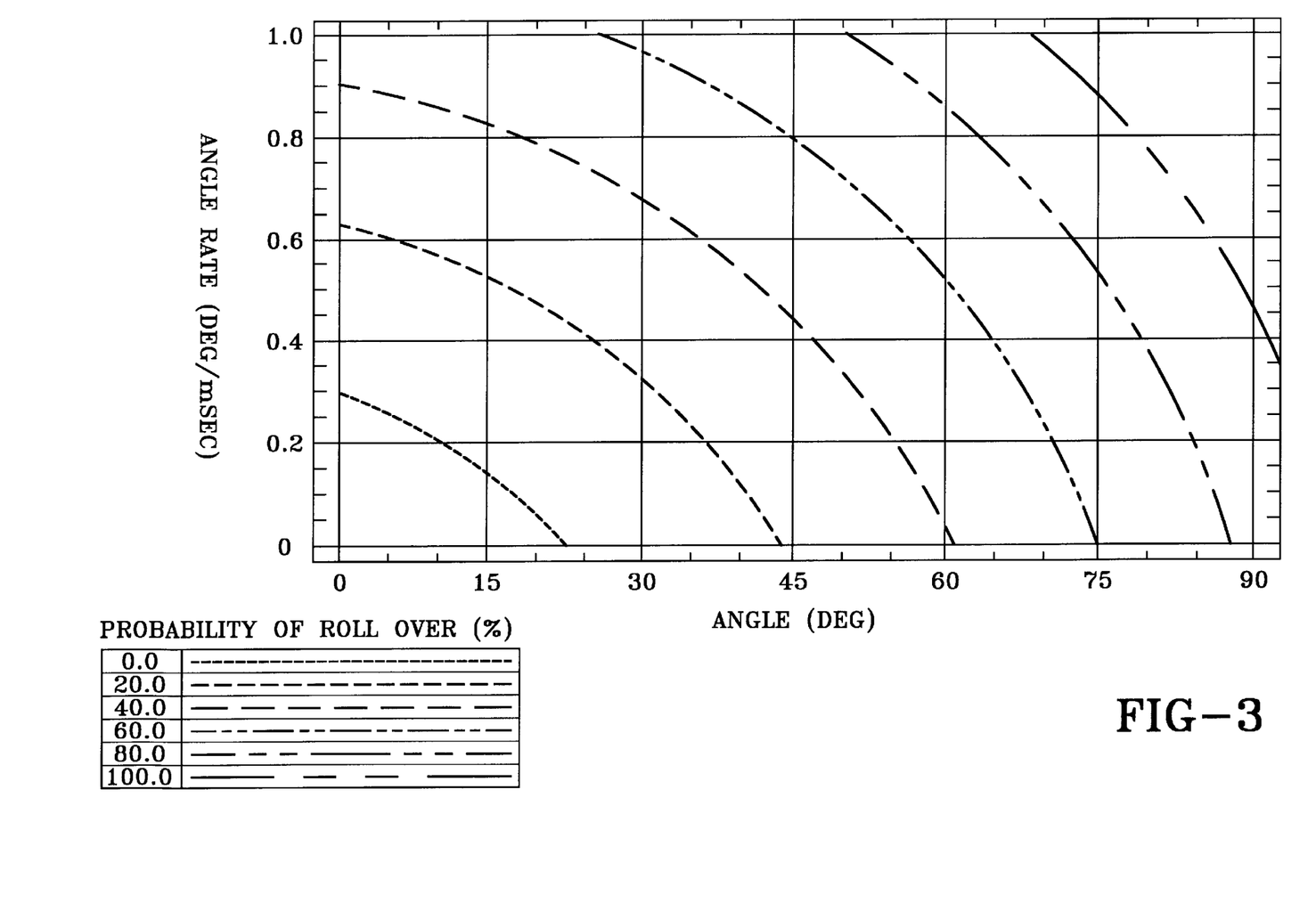
FIG. 3 is a family of curves depicting the probability of a roll-over condition as a function of the roll angle and the rate of change of the roll angle.
Figure 4:
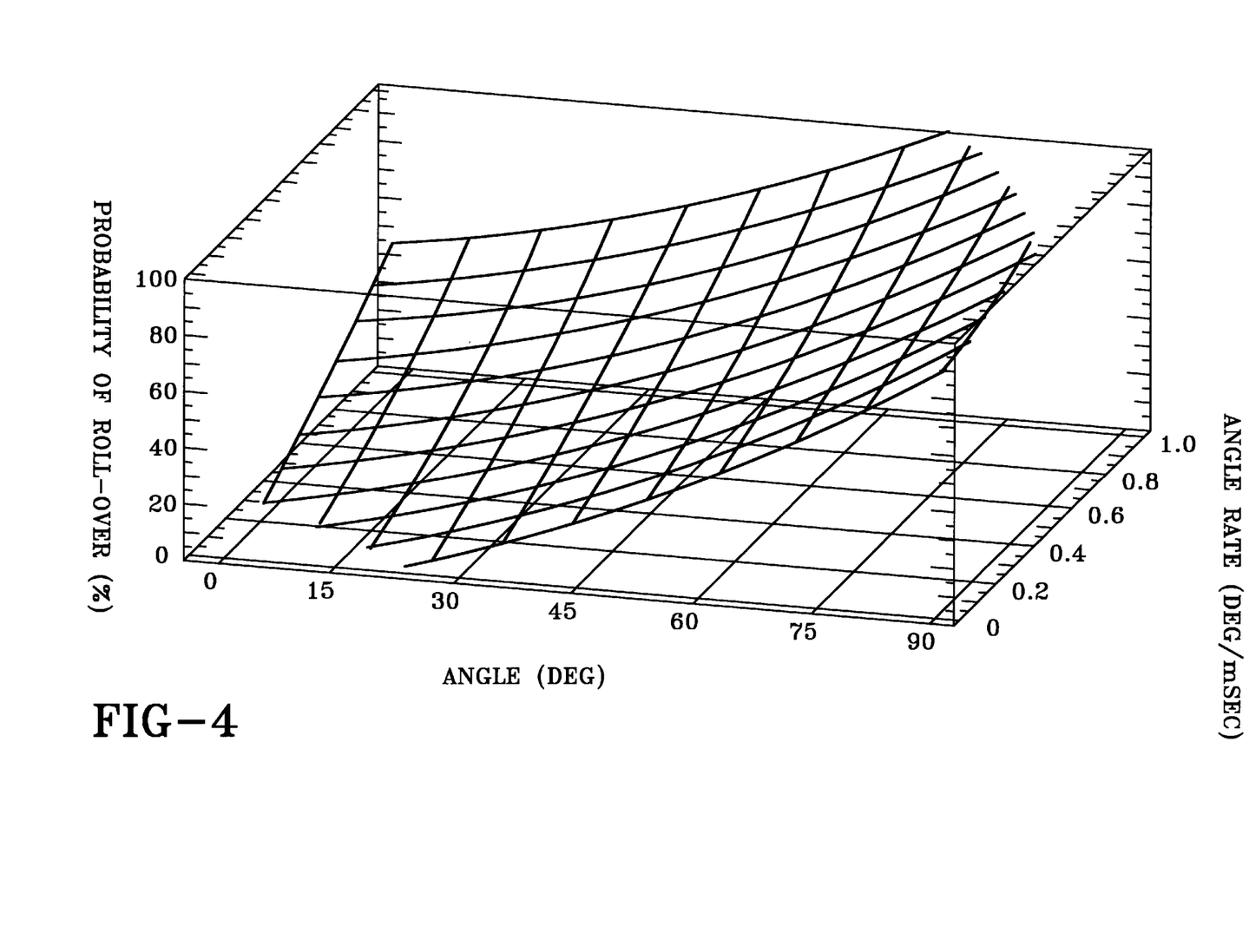
FIG. 4 is a map of the family of curves depicted in FIG. 3.
Figure 5:
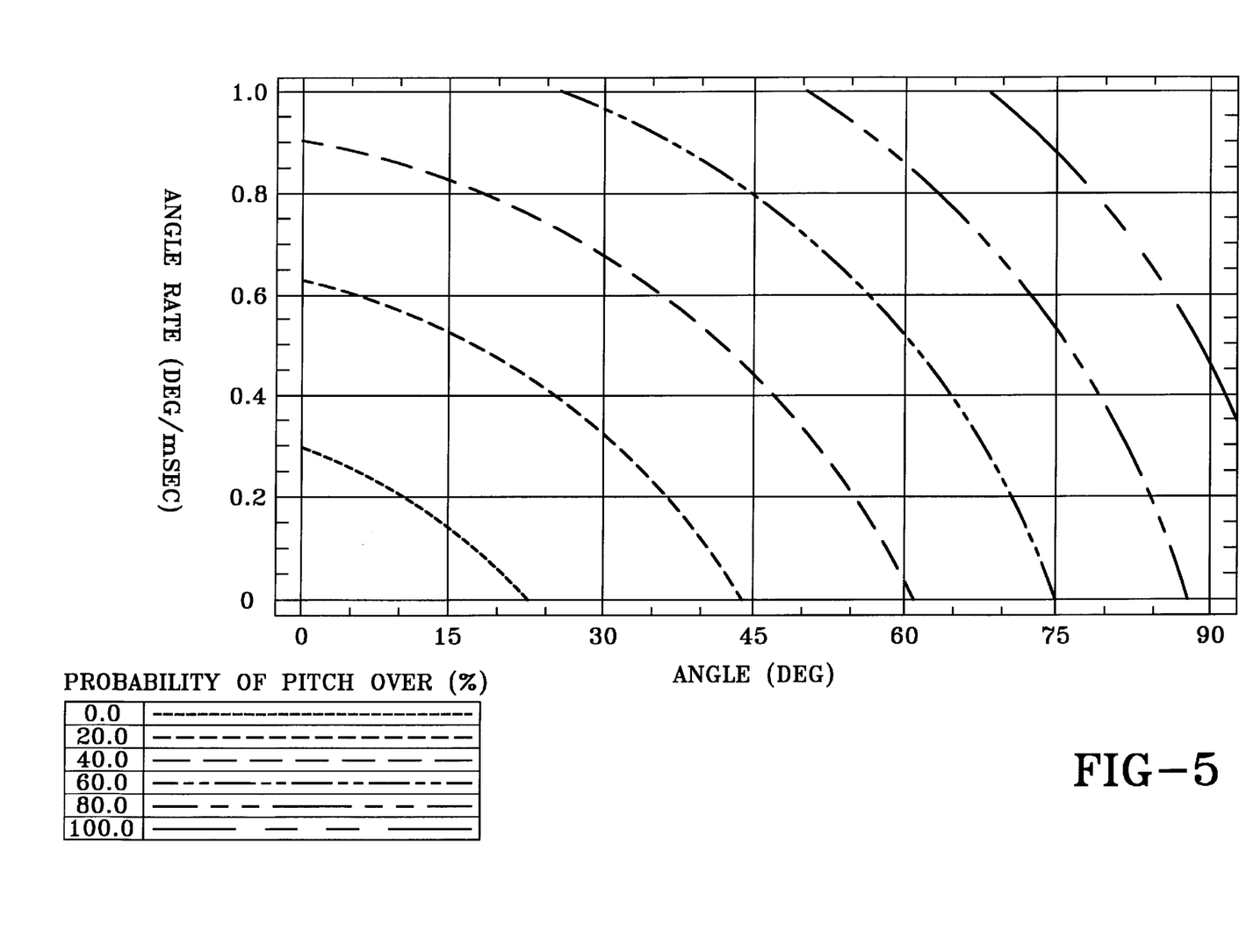
FIG. 5 is a family of curves depicting the probability of a pitch-over condition as a function of the pitch angle and the rate of change of the pitch angle.
Figure 6:
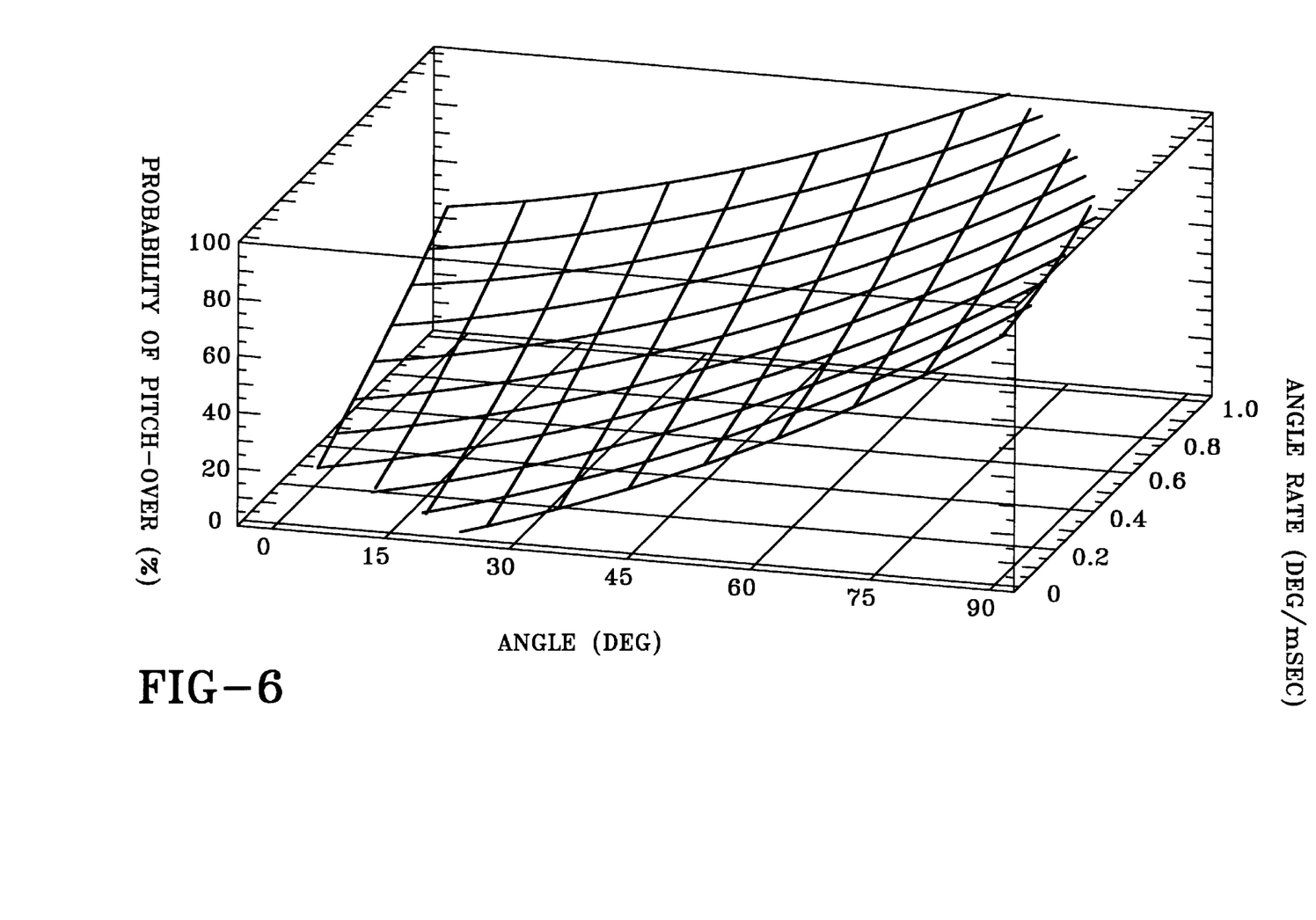
FIG. 6 is a map of the family of curves depicted in FIG. 5.

As shown in FIG. 2, the control means 22 comprises a control signal generator means 42 including a scaling amplifier 44, a first control signal generator comprising a first stage 46 and a second stage 48 to receive the first frequency signals from the first, second and third filters 28, 30 and 60, respectively and a second control signal generator 50 to receive the second frequency signal from the first second and third filters 28, 30, and 60, respectively and an actuator signal generator means 52. The scaling amplifier 44 scales and amplifies the digitized signals received from the sensing means 20 corresponding to the pitch and roll angles of inclination along the X-axis and Y-axis respectively. The first stage 46 of the first control signal generator includes logic means to generate a pitch angle signal and a roll angle signal corresponding to the angle of inclination of the vehicle relative to the roadway along the X-axis and Y-axis respectively. The pitch and roll angle signals are fed to the second stage 48 including storage means to store the families of curves shown in FIGS. 3 and 5 and the maps shown in FIGS. 4 and 6, and means to generate the rate of change of the pitch angle and rate of change of the roll angle. The first control signal generator means further includes logic circuitry to generate a first control signal when either the pitch angle and pitch angle rate each exceeds a predetermined value indicative of a pitch-over condition or when the roll angle and roll angle rate each exceeds a predetermined value indicative of a roll-over condition by comparing the pitch angle and pitch angle rate to predetermined values of pitch angle and pitch angle rate as depicted by the family of curves of FIG. 3 and the map shown in FIG. 4 and comparing the roll angle and roll angle rate to predetermined values of roll angle and roll angle rate as depicted by the family of curves of FIG. 5 and the map shown in FIG. 6 respectively.

The actuator signal generator means 52 includes logic means to generate an actuator signal to actuate at least one vehicular safety device selected from the group consisting of an airbag, an automatic roll-over bar, automatic door locks, and an emergency radio or telephone transmitter when the first control signal is received from the first control signal generator means.

The second control signal generator means 50 includes logic means to generate a first control signal when the G force sensed by the sensor means 20 exceeds a second predetermined value such as from about 1 G to about 5 G's and a third control signal when the G force sensed by the sensor means 20 exceeds a second predetermined value greater than 5 G's. The actuator signal generator means 52 further includes logic means to generate a first actuator signal to actuate at least one of the vehicular safety devices 12, 14 or 16 when the second control signal is received from the second control signal generator means 50 and to generate a second actuator signal to actuate at least one of the other vehicular safety devices 12, 14 and 16 when the third control signal from the second control signal generator means 50 is received.

Figure 7A:
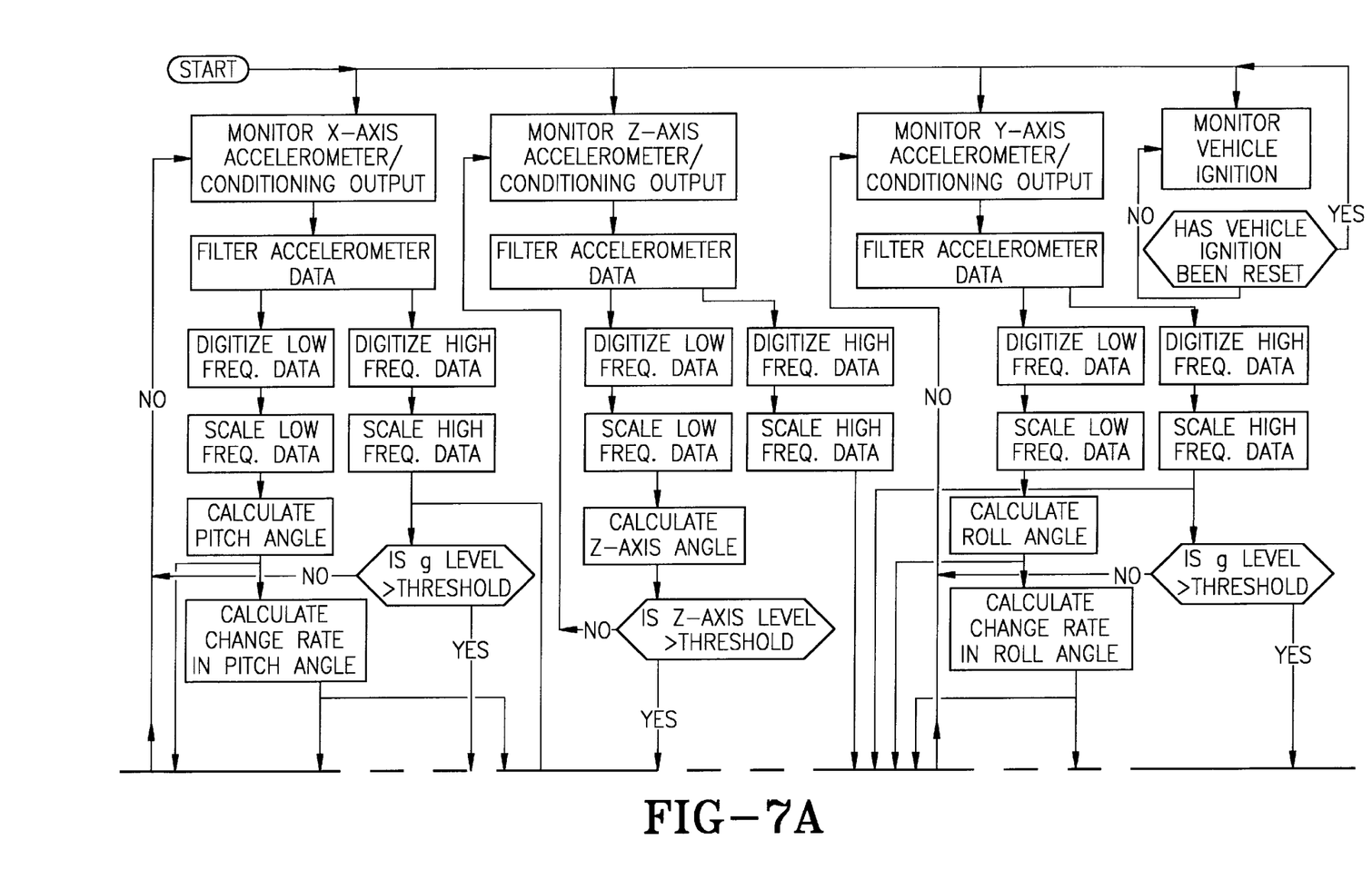
FIG. 7 is a flow chart depicting the operation of the control device of the present invention.
Figure 7B:
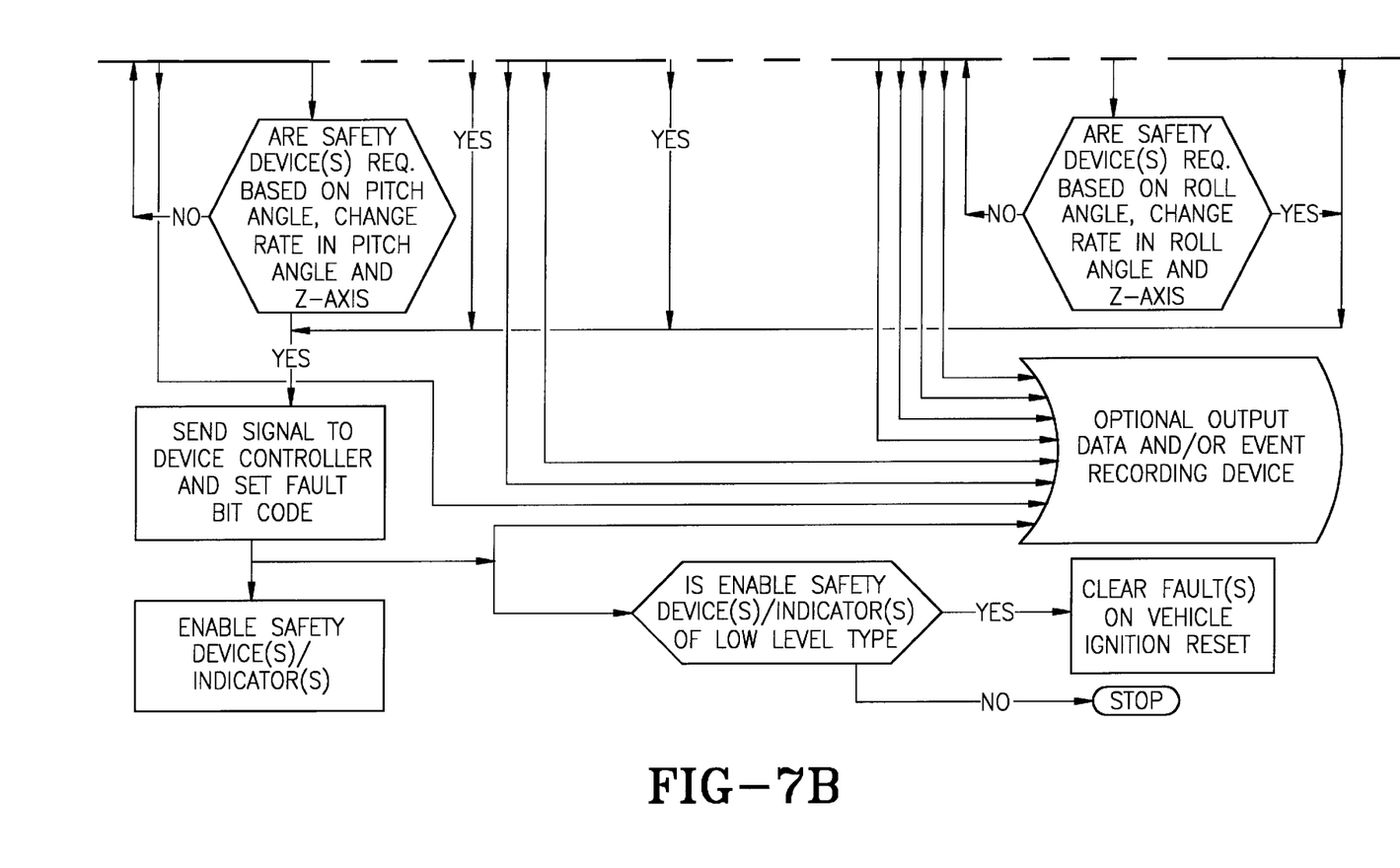

As shown in FIGS. 2 and 7, the values of the G forces measured along the X-axis, Y-axis and Z-axis as well as the pitch and roll angles together with the pitch and roll angle rates about the X-axis and Y-axis may be fed to an optional output data and/or event recording device (not shown). The control device 10 may further include a system reset means to clear faults and reset the control device 10 upon ignition key operation.

Although the invention has been described in its preferred embodiment, it is understood that the present disclosure of the preferred embodiment may be changed in details of construction and the combination and arrangement of elements may be departed from without diminishing the scope of the invention as hereinafter claimed.

We claim:

1. A control device to selectively actuate at least one vehicular safety device comprising:

sensor means to a pitch angle and a roll angle of a vehicle and to generate a corresponding digital signal representing each such pitch angle and roll angle;

control means, coupled to said sensor means, including circuitry to receive said digital signals and to generate a first control signal when either said digital signal representing said pitch angle and roll angle exceeds a respective value and a second control signal when the sensor means senses a G force impact exceeding a respective value; and actuator means including circuitry to receive said first and second control signals and to generate an actuator signal in response thereto to actuate at least one vehicular safety device.

2. A control device to selectively actuate at least one vehicular safety device according to claim 1 wherein the sensor means comprises a first sensing element having an X-axis accelerometer, a second sensing element having a Y-axis accelerometer and a third sensing element having a Z-axis accelerometer; the X-axis accelerometer, the Y-axis accelerometer and the Z-axis accelerometer operative to generate analog signals corresponding to the angular inclination of the vehicle relative to a surface; the pitch angle or inclination of the longitudinal center line of the vehicle relative to the surface is measured about an X-axis and the roll angle or inclination of the transverse center line of the vehicle relative to the surface is measured about a Y-axis; the control means measures pitch and roll angles of inclination and calculates the pitch and roll angle rates of change to predict when the vehicle will rotate through a predetermined arc about the X-axis (pitch) or Y-axis (roll).

3. A control device to selectively actuate at least one vehicular safety device according to claim 2 wherein the sensor means comprises first and second filters to selectively filter the corresponding analog signals from the first and second sensing elements into a first frequency band width corresponding to the angles of inclination to the X-axis and Y-axis relative to the surface indicative of the pitch and roll condition of the vehicle and a second band width corresponding to acceleration indicative of an impact.

4. A control device to selectively actuate at least one vehicular safety device according to claim 3 wherein the first frequency band width is in the range from about 0 Hz to about 40 Hz and the second frequency band width is in the range from about 0 Hz to about 2000 Hz.

5. A control device to selectively actuate at least one vehicular safety device according to claim 3 wherein the sensor means further includes an analog to digital Converter which receives the first and second frequency analog signals from the first and second filters and converts the first and second frequency signals into digital signals.

6. A control device to selectively actuate at least one vehicular safety device according to claim 3 wherein the control means includes a control signal generator means having a first control signal generator to receive the first frequency band width signals from the first and second filters; and a second control signal generator to receive the second frequency band width signal from the first and second filters; the first control signal generator including a first stage and a second stage.

7. A control device to selectively actuate at least one vehicular safety device according to claim 1 wherein the actuator means includes an actuator signal generator.

8. A control device to selectively actuate at least one vehicular safety device according to claim 6 wherein the first stage of the first control signal generator includes logic means to generate a pitch angle signal and a roll angle signal corresponding to the angle of inclination of the vehicle relative to the surface along the X-axis and Y-axis respectively and the second stage of the first control signal generator includes storage means and means to generate the rate of change of the pitch angle and rate of change of the roll angle from the pitch and roll angles signals generated by the first stage.

9. A control device to selectively actuate at least one vehicular safety device according to claim 8 wherein the first control signal generator further includes logic circuitry to generate a first control signal when either the pitch angle and/or pitch angle rate of change each exceeds a predetermined value indicative of a pitch-over condition or when the roll angle and/or roll angle rate of change exceeds a predetermined value indicative of a roll-over condition by comparing the pitch angle and pitch angle rate of change to predetermined values of pitch angle and pitch angle rate of change respectively.

10. A control device to selectively actuate at least one vehicular safety device according to claim 7 wherein the actuator signal generator includes logic means to generate an actuator signal to actuate at least one vehicular safety device when the first control signal is received from the first control signal generator.

11. A control device to selectively actuate at least one vehicular safety device according to claim 6 wherein the second control signal generator includes logic means to generate a second control signal when the G force sensed by the sensor means exceeds a first predetermined value.

12. A control device to selectively actuate at least one vehicular safety device according to claim 11 wherein the first predetermined value is at least about 1 G's.

13. A control device to selectively actuate at least one vehicular safety device according to claim 6 wherein the second control signal generator includes logic means to generate a third control signal when the G force sensed by the sensor means exceeds a second predetermined value.

14. A control device to selectively actuate at least one vehicular safety device according to claim 13 wherein the second predetermined value is about 5 G's.

15. A control device to selectively actuate at least one vehicular safety device according to claim 7 wherein the actuator signal generator further includes logic means to generate a first actuator signal when the second control signal is received from the second control signal generator and to generate a second actuator signal to actuate another of the at least one vehicular safety devices when the third control signal from the second control signal generator is received.

16. A control device to selectively actuate at least one vehicular safety device according to claim 6 wherein the first control signal generator values for the G forces measured along the X-axis and Y-axis as well as the pitch and roll angles together with the pitch and roll angle rates about the X-axis and Y-axis are transmitted to a recording device.

17. A control device to selectively actuate at least one vehicular safety device according to claim 1 further including a system reset means to clear faults and reset the control device upon ignition.

18. A control device to selectively actuate at least one vehicular safety device, comprising:
a first sensing element operative to sense a pitch angle and pitch angle acceleration of a vehicle along a first axis and to generate a corresponding pitch angle signal and pitch angle acceleration signal;
a second sensing element operative to sense a roll angle and roll angle acceleration of a vehicle along a second axis, and to generate a corresponding roll angle signal and roll angle acceleration signal;
a third sensing element operative to sense acceleration of a vehicle and to generate an acceleration signal; and
a controller including a first control signal generator operative to generate a first control signal in response to either said pitch angle signal and said pitch angle acceleration signal each exceeding a first value, or said roll angle signal and said roll angle acceleration signal each exceeding a second value, a second control signal generator operative to generate a second control signal in response to said acceleration signal exceeding a third value; and
an actuator operative to actuate at least one vehicular safety device in response to said first control signal and to actuate another of said at least one vehicular safety device in response to said second control signal.

19. The control device of claim 18, wherein said second control signal generator is operative to generate a third control signal in response to said acceleration signal exceeding a fourth value.

20. The control device of claim 18, wherein said at least one vehicular safety device consisting of comprises the group of: an airbag, a seat pretensioner, an automatic roll-over bar, automatic door locks, an emergency radio, and a telephone transmitter.

* * * * *